United States Patent
Lu (10) Patent No.: US 7,887,881 B2
(45) Date of Patent: Feb. 15, 2011

(54) CURABLE COATING COMPOSITIONS

(75) Inventor: Zheng Lu, Brentwood, NH (US)

(73) Assignee: Henkel Corporation, Rocky Hill, CT (US)

( * ) Notice: Subject to any disclaimer, the term of this patent is extended or adjusted under 35 U.S.C. 154(b) by 1061 days.

(21) Appl. No.: 10/547,767

(22) PCT Filed: Mar. 4, 2004

(86) PCT No.: PCT/US2004/006669

§ 371 (c)(1),
(2), (4) Date: Sep. 2, 2005

(87) PCT Pub. No.: WO2004/078866

PCT Pub. Date: Sep. 16, 2004

(65) Prior Publication Data

US 2006/0194707 A1    Aug. 31, 2006

(51) Int. Cl.
*B28B 7/38*    (2006.01)

(52) U.S. Cl. .................................. 427/133; 427/331

(58) Field of Classification Search ................. 427/133
See application file for complete search history.

(56) References Cited

U.S. PATENT DOCUMENTS

| | | | | |
|---|---|---|---|---|
| 3,032,528 A * | 5/1962 | Nitzsche et al. | ................ | 528/34 |
| 3,609,178 A * | 9/1971 | Thomas | ........................ | 528/34 |
| 4,678,688 A * | 7/1987 | Itoh et al. | .................... | 427/387 |
| 4,719,125 A * | 1/1988 | Anello et al. | ................ | 438/780 |
| 4,886,551 A | 12/1989 | Fink et al. | .................... | 106/183 |
| 5,024,780 A | 6/1991 | Leys | ............................ | 252/162 |
| 5,229,212 A * | 7/1993 | Reed | ............................ | 428/429 |
| 5,387,434 A | 2/1995 | Black | ........................... | 427/154 |
| 5,773,091 A | 6/1998 | Perlman | ...................... | 427/384 |
| 5,962,067 A | 10/1999 | Bautista et al. | ........... | 427/163.2 |
| 6,255,373 B1 | 7/2001 | Akamatsu et al. | ............ | 524/188 |
| 6,281,321 B1 | 8/2001 | Kelly et al. | .................... | 528/17 |
| 6,329,487 B1 * | 12/2001 | Abel et al. | ..................... | 528/21 |
| 6,342,097 B1 | 1/2002 | Terry et al. | ............. | 106/287.13 |
| 2001/0032568 A1* | 10/2001 | Schutt | .................... | 106/287.11 |
| 2002/0012754 A1* | 1/2002 | Yamamura et al. | .......... | 427/487 |
| 2002/0165319 A1* | 11/2002 | Knasiak et al. | ............. | 525/100 |
| 2003/0003310 A1 | 1/2003 | Macris et al. | | |

* cited by examiner

*Primary Examiner*—Michael Barr
*Assistant Examiner*—Robert S Walters, Jr.
(74) *Attorney, Agent, or Firm*—Steven C. Bauman (57) ABSTRACT

The present invention relates to curable coating compositions which when cured are substantially transparent and exhibit resistance to markings such as graffiti and scuffing and particulate buildup. In particular, the compositions of the present invention when cured provide protective coatings to surfaces to prevent absorption and/or wetting of ink compositions. The invention composition may also be used as mold release agents.

17 Claims, 1 Drawing Sheet

CURABLE COATING COMPOSITIONS

BACKGROUND OF THE INVENTION

1. Field Of The Invention

The present invention relates to curable coating compositions which when cured are substantially transparent and exhibit resistance to markings such as graffiti and scuffing and particulate buildup. In particular, the compositions of the present invention when cured provide protective coatings to surfaces to prevent absorption and/or wetting of ink compositions. The invention composition may also be used as mold release agents.

2. Brief Description Of Related Technology

Graffiti is understood to mean any unwanted markings on a surface, such as a building structure. Typically, it refers to unwanted paintings, words, and drawings. Such markings usually are applied by paints, such as spray paint, magic markers, or other inks. Paints are the most common source of graffiti, especially oil-based paints, such as enamels, epoxies, lacquers, and urethanes. Unwanted markings, however, may be produced by a variety of other sources, such as grease, crayons, and lipstick, among others.

Graffiti continues to be a problem of significant concern in today's society. Rather than a form of art, graffiti is considered vandalism and is an irritating eyesore in both public and private places. Graffiti. decreases the value of private properties and drives customers away from businesses. It often defaces public buildings and institutions, such as schools, trains and buses, as well as their stations, public restrooms, park structures, bridges, and tunnels, among many others.

A number of conventional cleaning techniques have been utilized to deal with the graffiti problem. These techniques typically involve cleaning the surface after it has been defaced by graffiti. Such cleaning techniques include sandblasting, sanding, high pressure power washing, and chemical treatments, among other similar procedures. Examples of cleaning compositions developed for removing graffiti are disclosed in U.S. Pat. No. 5,024,780 (Leys).

These cleaning methods, however, are costly and time-consuming. The cleaned or treated surface often is deteriorated by the harsh cleansing or chemicals. As a result, the surface has to be restored and repainted at high costs. Moreover, chemical treatment procedures often involve harsh, environmentally harmful chemicals, which pose dangers to human contact.

As such, it is desirable to develop compositions that protect surfaces from unwanted markings, which may be applied before any graffiti is created thereon. Protective coating compositions that have been developed in the past include those that are applied as part of the surface paint. These paint coatings, however, suffer the problem of damage by graffiti removal agents. Other protective coatings that have been developed include compositions that are applied on top of the paint or directly onto the surface. Examples of such coating compositions are disclosed in U.S. Pat. Nos. 5,387,434 (Black) and 5,773,091 (Perlman).

The protective coatings disclosed in Black include water-based wax containing compositions, sodium silicate, rosins, gums, and/or combinations thereof. Power washing can be used to remove these coatings with the graffiti from the surface. Perlman discloses protective coatings that are improved wax-based compositions. Perlman also discloses methods for cleaning the improved wax-based coatings, such as heating, pressurized water cleaning, and organic solvent based cleaning.

The present invention addresses the need for a mark resistant composition which cures at ambient conditions on a wide range of surfaces to provide a film coating on which among other things ink compositions are unable to penetrate or form a continuous film and hence are easily wiped off. In addition, the present invention provides such a composition that reduces the tendency of particulate buildup on surfaces coated therewith.

SUMMARY OF THE INVENTION

The inventive compositions are curable compositions, which when cured impart mark resistant properties to a surface, and which make graffiti removal much easier than known coatings which share substantial transparency.

The inventive compositions also reduce the tendency of particulate buildup on surfaces coated therewith.

In one aspect of the invention, the inventive compositions are curable (such as by exposure to moisture) and include a functionalized siloxane (such as a hydroxy terminated one); at least one agent selected from a multi-functional silane, an amino functional silane, an enoxy functional silane, a silazane, and combinations thereof; and optionally, a carrier. Upon moisture cure at ambient temperature graffiti markings made on a surface coated with such a composition are readily removable.

Another aspect of the present invention is directed to a method for imparting mark-resistant properties to a surface once cured. The method includes the steps of applying a film coating of an inventive composition to a surface to inhibit graffiti markings or other scuff markings thereon, and exposing the film coating to moisture at ambient temperature to cure the composition.

Further aspect of the present invention is directed to a method for imparting particulate buildup-resistant properties to a surface. The method includes the steps of applying a film coating of an inventive composition to a surface to inhibit the buildup of particulate matter thereon once cured, and exposing the film coating to moisture at ambient temperature to cure the composition.

Further aspect of the present invention is directed to a method for using the inventive composition as a mold release agent. The method includes the steps of applying a film coating of an inventive composition to a surface of a mold and exposing the film coating to moisture at ambient temperature to cure the composition.

A still further aspect of the present invention is directed to a method for preparing the inventive composition. This method includes the step of combining with mixing a functionalized siloxane with a crosslinker, optionally in a carrier, thereby forming the inventive composition.

The inventive compositions confer one or more of the following benefits and advantages when cured beyond mark resistance and particulate buildup resistance, high gloss retention and clear or invisible on the substrate surface (that is, substantial transparency when cured). The inventive compositions are also appropriate for use on most smooth surfaces, fast curing at room temperature (<30 minutes), semi-permanent, UV and weather stable, one-component (no mixing required by the end user) and low surface tension [thus appropriate for use with a wide variety of substrates (even polyolefins, to which are ordinarily difficult to apply a coating)].

DETAILED DESCRIPTION OF THE INVENTION

The present invention is directed to curable compositions, which upon cure are substantially transparent and are resistant to markings, such as graffiti and scuffing, and repel the collection of dust and dirt thereby preventing buildup thereof on surfaces of substrates to which has been applied the curable compositions. Graffiti or scuff markings made on surfaces coated with these compositions are removable by wiping or with other similar conventional means.

The compositions cure by exposure to moisture at ambient temperature to form a film coating, imparting mark resistant and/or particulate buildup resistant properties to surfaces. The compositions are also useful as a mold release agent.

The term "cure" or "curing," as used herein, refers to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing. The mechanisms by which compositions of this invention may cure include, in the context of silicone chemistry, addition cure (such as by way of hydrosilation reactions), condensation cure (in which crosslinking of silanol, silazane, enoxy, alkoxy, acetoxy, and the like groups occur), ring opening cure, UV cure (such as by way of silylene reactions), and of course combinations thereof.

The inventive compositions include broadly a functionalized siloxane and a crosslinker, together with one or more of the following optional components catalyst, carrier, filler, plasticizer, color indicator, and surfactant.

Whether the cure mechanism is by way of a condensation cure, addition cure or UV cure, the base polymer may be a branched or linear siloxane and/or functionalized siloxane within following structure:

where the number of repeating units, "n", plays a role in determining the molecular weight and the viscosity of the composition. $R^1$, $R^2$, $R^3$, $R^4$, $R^5$, and $R^6$ may be the same or different and may be siloxane, alkyl, allyl, aryl, alkoxy, amino, hydroxyl, hydrogen, mercapto, halo, and cyano, and n is from 0 to about 100,000. $P_1$ and $P_2$ may be the same or different and may be alkyl, allyl, hydroxyl, hydrogen, amino, acetoxy, alkoxy, enoxy, and oxime. Interruption of the polymer chain by a heteroatom is also within the scope of the present invention.

The crosslinker for condensation cure reactions include functionalized silanes, such as cyclic/linear/branched silicone oligomers that have at least two reactive functionalities. The reactive functionality include silazane, silanol, alkoxy, acetoxy, amino, oximino, amido, and enoxy groups or combinations thereof. For addition cure reactions, the functionality includes allyl, alkyl, hydride groups or combinations thereof. For UV cure reactions, the functionality include allyl, alkyl, mercapto, and (meth)acryloxy groups or combinations thereof.

The compositions of the present invention may also include a catalyst for accelerating or otherwise promoting the cure process, such as with condensation reactions. In such case, the catalyst may be chosen from an organic tin, titanium compound, and strong. Lewis bases. Generally, the catalyst is present from about 0% to about 0.5% (w/w). This concentration, however, can be varied depending upon the particular components chosen, the desired cure mechanism and the desired cure rate.

Carriers for the composition may be included, if desired. In such case, the carrier may be chosen from organic solvents (such as aliphatic hydrocarbons containing 8 to 12 carbon atoms and aromatic hydrocarbons containing 8 to 12 carbon atoms), low molecular weight siloxanes (such as siloxanes containing 2 to 6 silicone atoms and cyclic siloxanes containing 3 to 5 silicone atoms), water, aerosol propellants (whether chlorinated fluorocarbons or not, such as propane), and supercritical $CO_2$ fluid. In addition, low VOC solvents may be used to prepare the inventive compositions; low VOC formulations have <600 g/L of volatile organic solvents. Carriers may be present in the inventive compositions, for example, in an amount from about 10% to about 90% (w/w). Desirably, carriers are present in an amount from about 60% to about 85% (w/w).

Fillers may be included, such as for the purpose of enhancing the durability of the coating. Suitable fillers include silicas, such as treated silicas, clays, MQ resins (as are known in the art), and titanium oxide.

Plasticizers may also be included to impart a degree of modulus, if desired. Suitable plasticizers include inert oligomeric or polymeric compounds, desirably such compounds are compatible with the cross-linkable base polymers mentioned above. Preferably these plasticizers are less compatible with the crosslinked base polymers; thus, a portion of the plasticizer may be capable of migrating to the surface of the cured coating. These plasticizers include for instance polydialkylsiloxanes, branched polydialkylsiloxanes, polyfluorinated dialkylsiloxanes, and organofunctional polyalkylsiloxanes.

A color indicator such as pigments, dyes, and trace UV dyes may be added where a color is desirable for the composition.

A surfactant may also be desirable where surface wetting and film formation characters should be modified. Surfactants may be chosen from ionic and non-ionic ones, depending of course on the particular set of physical properties sought in the specific application.

A charge dispenser may be useful in some cases to eliminate static charger on a treated surface so less particle matter, such as dust or undesired objects, is attracted to the surface.

For addition cure reactive compositions (such as moisture curable compositions), the above optional components may be included, though the catalyst will be organic compounds of platinum, titanium, tin, zirconium and of course combinations thereof. Tetraisopropoxytitanate and tetrabutoxytitanate are particularly desirable. See also U.S. Pat. No. 4,111,890, the disclosure of which is expressly incorporated herein by reference. Examples of such organic platinum catalysts include platinum divinyl complex (available commercially from UCT, Pennsylvania and Gelest, Pa.).

For UV cure reactive compositions, the above optional components may include, though the catalyst will be an UV initiator. Examples of such UV initiators include photoinitia- tors available commercially from Ciba Specialty Chemiclas under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl) phenyl phosphine oxide] and "DAROCUR" 1173 (2-hydroxy-2-methyl-1-phenyl-1-propane) and 4265 (the combination of 2,4,6-trimethylbenzoyl-diphenyl-phosphine oxide and 2-hydroxy-2-methyl-1-phenyl-propan-1-one); and the visible light [blue] photoinitiators, dl-camphorquinone and "IRGACURE" 784DC. Of course, combinations of these materials may also be employed herein.

For ring opening cure reactive compositions, the above optional components may be included, though the catalyst will be an acid or a base. Examples of such acid or base catalysts include sulfuric acid and potassium hydroxide, respectively.

The base curable polymer may be formed through a ring opening reaction with chemicals such as silacyclopropane [$R^1R^2Si(CH_2CH_2)$] or silacyclobutane $R^1R^2Si(CH_2CH_2CH_2)$, where $R^1$ and $R^2$ can be the same or different and may be selected from H, and alkyl and allyl groups.

The reactive functionality on the crosslinker for ring opening cure include halide (such as chloride), alkoxy (such as methoxy), cyano, silanol or combinations thereof.

Particularly desirable functionalized siloxanes for the base curable component include any conventional hydroxy terminated siloxane, or polysiloxane, which is capable of forming film coating upon combination with an appropriate crosslinker. Such hydroxy terminated polysiloxanes are represented by the following general formula:

I where $R^1$, $R^2$, $R^3$, $R^4$, $R^5$, and $R^6$ may be the same or different and may desirably be $C_{1-6}$ alkyl and n is from 1 to about 30,000 amu. Interruption of the polymer chain by a hetero atom other than oxygen is also within the scope of the present invention.

An example of a specific hydroxy terminated polysiloxane that may be used to form structure I is hydroxy terminated polydimethylsiloxane ("PDMS"), as represented by structural formula II:

II

The number of repeating units, "n", plays a role in determining the molecular weight and the viscosity of the composition. Thus, n is an integer from about 1 to about 30,000 amu. Desirably, PDMSs incorporated into the compositions of the present invention have a molecular weight of 4,000 amu or greater. The molecular weight of PDMS, however, may vary depending upon the desired thickness and/or viscosity of the film coating as applied to a surface. Viscosities of the compositions of the present invention generally are typically less than 2000 cps, and desirably are less than 500 cps.

Functionalized siloxanes, such as PDMSs, may be present in the inventive compositions, for example, in an amount from about 0.001% to about 50% by weight in the final composition (w/w). Desirably, PDMSs are present in an amount from about 0.01% to about 3% (w/w).

The compositions of the present invention also include as noted above a crosslinker to produce crosslinking with the polysiloxane and/or with itself, as well as compositions that interact with a surface material. Crosslinking is the attachment of two or more chains of polymers by, for example, bridges and cross bridges, comprising either an element, a group, or a compound. The crosslinking agent functions as a chemical group that can chemically interact with the functional siloxane as well as the residue functional group on a surface. The interaction of the crosslinking group promotes the chemical bonding of the anti-graffiti coating to the surface so that the coating can last longer in a given environment. The crosslinking reactions will initiate as soon as the inventive composition is exposed to moisture. Certain crosslinking agents unexpectedly have been found to provide curing properties, which in combination with hydroxy terminated polysiloxanes produce compositions having when cured in less than 30 minutes under ambient conditions anti-graffiti or anti-scuffing and/or anti-particulate buildup properties, while retaining substantial transparency yielding high gloss.

Suitable crosslinkers, which when combined with the siloxane have been found to produce mark resistant and/or particulate buildup resistant coatings that are substantially transparent when cured, include certain multi-functional silanes, such as amino functional silanes, hydride functional silanes and enoxy functional silanes, silazanes, and combinations thereof. Upon mixing with appropriate polysiloxanes, these agents provide curing properties and produce compositions that inhibit markings and particulate buildup, as well as provide substantial transparency yielding excellent gloss retention.

Organofunctional silanes, within the class of silicon hydride compounds are known for their ability to assist in the bonding of organic polymers to inorganic substrate materials. The compositions of the present invention may include amino and/or enoxy functional silanes. An example of an amino functional silane that may be used in accordance with the present invention is represented by structural formula III:

III

Other suitable amino functional silanes include di- or tri-amino functional silanes, such as $CH_3Si(NHCH_3)_3$.

An example of an enoxy functional silane that may be employed in the compositions of the present invention is represented by structural formula IV:

IV

The incorporation of amino and/or enoxy functional silanes in the compositions of the present invention have been found to provide excellent anti-graffiti, anti-scuffing and anti-particulate buildup properties, when combined with hydroxy terminated polysiloxanes. Certain other functional silanes, particularly ethoxy functional silanes and epoxy functional silanes, do not exhibit as useful anti-graffiti and/or release properties when used alone in the compositions of the present invention. Ethoxy and epoxy functional silanes, however, may be useful when combined into other structures, for example, as a functional group in a ladder structure silazane.

Desirable silazanes for incorporation in the compositions of the present invention include cyclic silazanes and ladder structure silazanes. Silazane compounds contain alternating silicon and nitrogen atoms. Cyclic silazanes contain one or more closed rings. An example of a cyclic silazane is represented by the following general formula V:

V

One particularly desirable cyclic silazane is tris cyclo silazane, represented by structural formula VI:

VI

Also desirable as silazanes in accordance with the present invention are ladder structure silazanes. Ladder structure silazanes contain linear chains that crosslink in ladder-like formations. Structural formula VII represents a ladder structure silazane suitable for use in the compositions of the present invention. Other similar ladder structure silazanes, however, also may be suitable for use in these compositions. Formula VII is represented by:

VII where each R is independently methyl or ethyl, y ranges from about 20% to about 80% of the compound, z ranges from about 0% to about 40% of the compound, and n is from 1 to about 500.

The ladder structure silazane of formula VII is derived from a linear chain silazane compound, which is represented by structural formula VIII:

VIII where each R is independently methyl or ethyl, x ranges from about 20% to about 50% of the compound, y ranges from about 20% to about 80% of the compound, and z ranges from about 0% to about 40% of the compound.

Upon addition of ammonia, the ladder-type structure of formula VII is formed. In particular, ammonium chloride is generated as a by-product of the reaction, which causes in situ formation of the ladder structure. The "x" portion of the structure of formula VIII crosslinks, while the "y" and "z" portions remain in linear chains. Due to their in situ formation, a ladder structure silazane used in the compositions of the present invention is a mixture of the compounds of formula VII and VIII.

Desirable crosslinkers may be present in the inventive compositions, for example, in an amount from about 0.1% to about 50% (w/w). Desirably, crosslinking agents are present in an amount from about 1% to about 15% (w/w).

Any conventional catalyst may be employed provided the desired properties of the inventive compositions are not compromised. Suitable catalysts that may be used include conventional organometallic catalysts, such as organic titanium derivatives, organic tin.

A particularly desirable inventive composition combining these components includes: about 0.01% to about 5% of tris cyclo silazane; about 0.005% to about 1% of hydroxy terminated polysiloxane; and the balance, up to about 99%, of a carrier, is a solvent.

Another desirable inventive composition includes: about 0.5% to about 5% of a ladder structure silazane; about 5% to about 30% of an amino functional silane; about 0.01% to about 5% of a hydroxy terminated polysiloxane; and the balance being a carrier, which includes a solvent. Other desirable compositions are set forth in Table 3.

Upon application to a surface, the inventive compositions moisture cure (desirably in less than 30 minutes at ambient temperature) to form film coatings, which are resistant to markings, such as graffiti or scuffing, as well as particulate buildup, and are substantially transparent and retain their gloss. The application of heat is not necessary to effect curing.

These film coatings desirably have a thickness of less than 2.5 microns as applied to a surface. To enhance the aesthetic effects of the compositions as applied to a surface, the compositions may further include an alkoxy silane prepolymer resin and/or an alkoxy functional prepolymer resin, also referred to as an MQ resin (as such resins are known in the art). Such resins improve the ease of application and/or the surface finish of the film coatings, providing a glossy appearance. The glossier finish may be desirable for a variety of applications, such as for coating the side panels of buses and trains. Generally, concentrations of from about 0% to about 5% (w/w) are sufficient.

The present invention also is directed to methods of imparting to a surface mark-resistant and particulate buildup-resistant properties. According to these methods, a film coating of the inventive composition is applied to a surface to inhibit graffiti markings or other scuff markings thereon, or particulate buildup thereon.

The inventive composition may be applied by wiping or spraying it onto the desired surface, or by any other suitable means, to form a film coating on the surface. A single coat usually will be sufficient, however, additional coats may be applied, as desired. For example, it may be desirable to apply several coats of the inventive composition on rougher surfaces. If multiple coats are applied, curing may desirably be permitted between each application.

Other application methods for the inventive compositions include spraying (such as by aerosol or pump driven), wiping, brushing, dipping, and rolling.

After application to the surface, the inventive composition in film form is exposed to moisture at ambient temperature to cure the composition. Cure ordinarily occurs in less than 30 minutes, and desirably does so. Although heat could be applied, it is not necessary to effect curing sometimes in as short as about 5 to about 20 minutes. The cure time, however, may be even shorter upon addition of certain appropriate catalysts, as described above. Once cured, any graffiti or other scuff markings created on the surface are easily removable by wiping or with other conventional means, and particulate buildup over time is seen to be dramatically less.

The inventive compositions when used as mold release agents desirably cure to a high durability finish that permits a number of releases without contaminating a released part by transfer of the release composition from the mold to the part. In addition, in some embodiments, the coating may desirably cure to a high gloss finish that permits a number of releases without measurable loss of initial gloss value. For example, the compositions of the present invention may cure to a finish having a gloss value of at least 80 as measured by a 60 degree gloss meter. After a number of releases, such as, for example at least five releases, this gloss value remains nearly the same. In addition, the finish remains sufficiently durable after the at least five releases such that the mold release composition has not transferred to the part.

Thus, the invention provides a method of imparting mark-resistant properties to a surface. The steps of this method include: applying a film coating of the inventive composition to a surface to inhibit markings thereon; and exposing the film coating to conditions appropriate to cure the composition.

The invention also provides a method of imparting particulate repellent properties to a surface. The steps of this method include: applying a film coating of the inventive composition to a surface to inhibit particulate buildup thereon; and exposing the film coating to conditions appropriate to cure the composition.

Of course, a mark-resistant film comprising the reaction product of the inventive composition and a particulate buildup film wherein the composition comprising the reaction product of the inventive composition, respectively, are also provided by the invention.

And the invention provides a method of enhancing the gloss value of a part molded in a mold coated with a cured mold release composition to at least 80. The steps of this method include: applying a film coating of a mold release composition to a surface in a mold; and exposing the film coating to conditions appropriate to cure the composition.

End user market opportunities for the inventive compositions include beyond mold release agents, infrastructure (such as application on the surfaces of road signs, school busses, mailboxes, bridges, and tunnels); automotive aftermarket type market applications (such as wheels and wheel wells, front fascia and trims, windshield and side windows and under carriage); construction (such as inside the dwelling like bathrooms, lockers and windows, and the exterior of the dwelling to maintain the appearance of the dwelling); engine compartment; maintenance, repair and operations ("MRO") type market applications (such as paint booths and selective masking); vehicular assembly (such as for all exposed components in the engine compartment for overall cleanliness exciter/toner/ABS rings, sensors, and radiators for cleanliness and heat management and related equipment (such as busses (like school or commuter), trains/subways cars, trucks and trailers, and boats); mold release agents for use with polyesters and epoxy parts and other composites; and additive for paint formulations.

Additional end user automotive after market opportunities include wipe versions, such as for coating wheel rims to protect them from brake dust or for coating the windshield.

EXAMPLES

Example 1

This example describes a formulation of components used to make a composition of the present invention. Table 1 depicts the weight percent of each of the following components in the composition: tris cyclo silazane; hydroxy terminated polydimethylsiloxane; and as a solvent, a mixture of aromatic and aliphatic hydrocarbons containing 8 to 12 carbon atoms.

TABLE 1

| COMPONENT | WT. % |
|---|---|
| Tris cyclo silazane | 3.65 |
| PDMS | 0.06 |
| Mixture of $C_8$ to $C_{12}$ aromatic and aliphatic hydrocarbons | 96.29 |

The components were mixed well in the hydrocarbon solvent under nitrogen conditions to prevent the introduction of moisture into the composition. The resulting composition (Sample No. 1) was applied to a surface by either wiping or spraying to form a film coating. The coating was exposed to atmoshereic moisture at ambient temperature for about 5 to 20 minutes to effect curing.

Figure 1A:
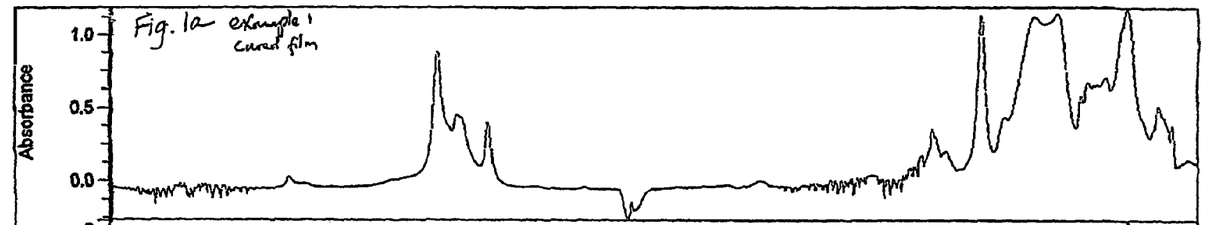
FIG. 1a is an FTIR spectrum of a cured film coating composition of the present invention.
Figure 1B:
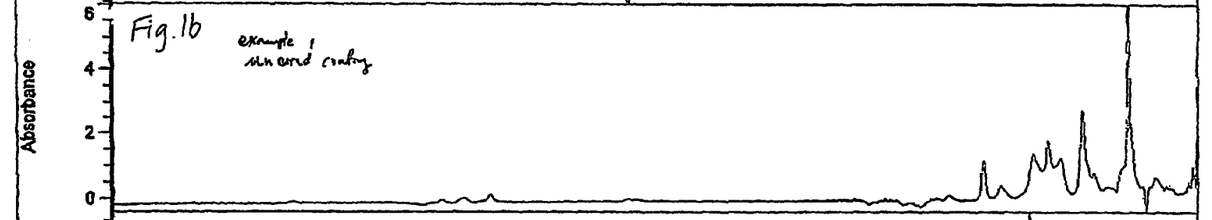
FIG. 1b is an FTIR spectrum of the coating composition of FIG. 1a prior to curing.

FTIR spectra of both the cured and uncured compositions are depicted in FIGS. 1a and 1b respectively. The peak of about 950 cm$^{-1}$ in FIG. 1b shows the presence of a silazane functional group. The FTIR of the cured film (FIG. 1a peaks at about 800 cm$^{-1}$, 1020 cm$^{-1}$, 1100 cm$^{-1}$, and 1260 cm$^{-1}$) indicates that all silazane functional groups are consumed. The nature of the cured coating is a crosslinked polysiloxane.

A BYK Gardner 60 degree micro-gloss meter was used to measure part gloss. A clean substrate constructed from polyester gel coat surface has an average gloss value of 91.8. Sample No. 1 demonstrated a glossy finish on the coated surface with an average gloss value of 85.0, which is only a reduction in gloss value of 6.8 units or 7.4%.

Tests referred to as scrape and tape were designed to evaluate graffiti cleanability by mechanical removal.

The scrape and tape tests were conducted by coating a smooth surface with an inventive composition. The two surfaces used in our tests were gray or orange gel coat boards and Imron painted steel panels. One coat of each composition was spray or wiped applied to the smooth surface and allowed to cure. Spray paint was applied over the coating and allowed to dry for more than 12 hours.

In the scrape test, a wooden applicator was used to scrape the painted surfaces and evaluation of graffiti removal was defined by visual inspection.

In the tape test, a scotch brand tape was used on the painted surface. Cleanabilities of both methods were rated on a scale of 1-6. On this scale 1=0% paint cleaned, 2=≦5% cleaned, 3=6-49% cleaned, 4=50-94% cleaned, 5=≧95% cleaned and 6=100% cleaned.

The anti-graffiti rating was measured to be 5, irrespective of which test was used.

Example 2

This example describes another formulation of components used to make a composition of the present invention. Table 2 depicts the weight percent of each of the following components in the composition: a ladder structure silazane; an amino functional silane; hydroxy terminated polydimethylsiloxane; and a mixture of aromatic hydrocarbons containing 8 and 12 carbon atoms.

TABLE 2

| COMPONENT | WT. % |
|---|---|
| Ladder structure silazane | 1.05 |
| Amino functional silane | 10.01 |
| PDMS | 0.55 |
| Mixture of C$_8$ to C$_{11}$ aromatic hydrocarbons | 88.39 |

The components were mixed well in the solvent under nitrogen conditions to prevent the introduction of moisture into the composition. The resulting composition (Sample No. 2) describes another formulation of components used to make a composition of the present invention. The composition is applied to a surface by either wiping or spraying to form a film coating. The coating is exposed to moisture at ambient temperature for about 5 to 20 minutes to effect curing.

Figure 2A:
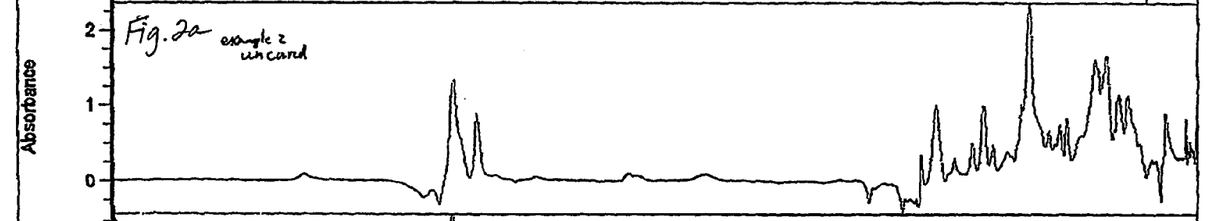
FIG. 2a is an FTIR spectrum of an uncured film coating composition of the present invention.
Figure 2B:
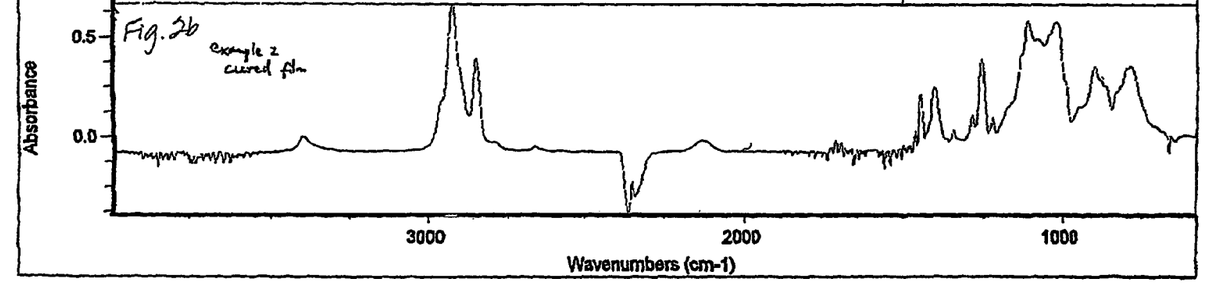
FIG. 2b is an FTIR spectrum of the film coating of FIG. 2a after curing.

FTIR spectra of both the uncured and cured composition are depicted in FIGS. 2a and 2b, respectively. The FTIR spectrum of the uncured composition in film form (FIG. 2a) provides information regarding the presence of the Si—N amino functional group (at about 1109 cm$^{-1}$) and multiple silazane groups at about 810 and 840 cm$^{-1}$. FIG. 2b provides information on the presence of polysiloxane.

Sample No. 2 demonstrated a glossy finish. And depending on the particular functional PDMS and solvent selected one can vary the surface gloss retention observed. For example, PDMSs with lower amu lead to higher gloss retention on the surface. The average gloss value for the parts coated with the moisture cured inventive composition was 82.3 and 86.0, which is only a reduction in average gloss value of 9.5 and 5.8 units, respectively, or 10.3% and 6.3%, respectively.

The anti-graffiti rating was measured to be 5, irrespective of which test was used. One can achieve a greater anti-graffiti rating by using PDMSs with higher amu or a blend of PDMSs with different amu.

Example 3

Synthesis

A. 1,2,3,4,5,6-hexamethyl-2,4,6-tris(methylamino)-cyclotrisilazane ("tris cyclosilazane"):

Methyl trichloro silane was reacted with methyl amine in a mixed hydrocarbon solvent under nitrogen environment in a pressured reactor. First 0.81 moles of the methyl trichloro silane was blended with 920 ml of a mixture of aromatic solvent in the reactor. Then 4.5 moles of methylamine was added to the batch slowly. The reaction temperature was increased during the amine addition. The addition of amine was completed over a 12 hour period. Slowly the excess amine was purged with dry nitrogen. Next water was added to the reaction, and the resulting suspension stirred overnight. The suspension was filtered under nitrogen, and the solution was collected as the product (in solution) without further purification. This silazane solution was used in Sample No. 3. The concentration of the final product ranged from 8-10% (w/w), as measured in percentage of product fully hydrolyzed with water.

B. Tris(methylamino) methyl silane:

Methyl trichloro silane was reacted with methyl amine in a mixed hydrocarbon solvent under nitrogen environment in a pressured reactor. First 0.44 moles of the methyl trichlorosilane was blended with 1000 ml of solvent. Then the mixture was cooled to a temperature below 15° C. Methylamine (2.90 moles) was added to the batch, and the reaction temperature controlled at below 20° C. until the reaction was completed, which was indicated by a pressure increase inside of the reactor. The suspension which resulted was filtered under nitrogen, and the solution was collected as the product (in solution) without further purification. This silane solution was used in Sample No. 6. The concentration of the final product ranged from 4-6% (w/w), as measured in percentage of product fully hydrolyzed with water.

Formulation:

Sample Nos. 3-10 were formulated using the ranges of the various components identified in Table 3a, and with those components in the amounts specified in Tables 3b and 3c.

TABLE 3a

| Type | Identity | 3 | 4 | 5 | 6 | 7 | 8 | 9 | 10 |
|---|---|---|---|---|---|---|---|---|---|
| Silazane | Triscyclo trisilazane | .01-5 | — | — | — | — | — | — | — |
| | Silazane/alkoxy co-functional oligomer | — | 1-20 | .05-5 | — | .2-15 | — | — | — |
| Siloxane | PDMS | .005-1 | .01-10 | .01-5 | .01-5 | .01-5 | .01-5 | — | — |
| | Tetra vinyl cyclosiloxane (ViD4) | — | — | — | — | — | — | .1-10 | — |
| | Mercapto functional siloxane | — | — | — | — | — | — | .2-50 | — |
| | Vinyl functional siloxane | — | — | — | — | — | — | 0-.50 | .1-50 |
| Silane | Tris (methylamino) methyl silane | — | — | — | .01-3 | — | — | — | — |
| | Tris (hexylamino) methyl silane | — | 5-50 | 1-50 | .01-3 | — | — | — | — |
| | Hydride functional silane | — | — | .01-10 | — | — | — | — | .1-10 |
| | Precondensed alkoxy silane | — | — | .01-10 | — | — | — | — | — |
| | Trienoxy methyl Silane | — | — | .01-10 | — | — | 2-25 | — | — |
| Cat. | Tin | — | — | .01-1 | — | — | 0.001-1 | — | — |
| | Platinum | — | — | — | — | — | — | — | .001-1 |
| | Inhibitor | — | — | — | — | — | — | — | .01-1 |
| | Camphorquinone | — | — | — | — | — | — | 0.01-2 | — |
| | DM-p-T | — | — | — | — | — | — | 0.01 | — |
| Plast. | Siloxane | — | — | — | — | — | — | — | 0-50 |
| Sol. | $C_8$ and $C_{12}$ aromatic/aliphatic hydrocarbons | Bal. | Bal. | Bal. | Bal. | 30-70 | Bal. | Bal. | Bal. |
| Prop. | Propane | — | — | — | — | 10-50 | — | — | — |

TABLE 3b

| Type | Identity | 3 | 4 | 5 | 6 | 7 | 8 | 9 | 10 |
|---|---|---|---|---|---|---|---|---|---|
| Silazane | Triscyclo trisilazane | 3.65 | — | — | — | — | — | — | — |
| | Silazane/alkoxy co-functional oligomer | — | 1.05 | .02 | — | 6.1 | — | — | — |
| Siloxane | PDMS | .06 | .55 | .01 | .62 | .6 | .35 | — | — |
| | Tetra vinyl cyclosiloxane (ViD4) | — | — | — | — | — | — | .54 | — |
| | Mercapto functional siloxane | — | — | — | — | — | — | 32.26 | — |
| | Vinyl functional siloxane | — | — | — | — | — | — | — | 39.99 |
| Silane | Tris (methylamino) methyl silane | — | — | — | .13 | — | — | — | — |
| | Tris (hexylamino) methyl silane | — | 10.1 | 1.8 | — | — | — | — | — |
| | Hydride functional silane | — | — | — | — | — | — | — | 1.33 |
| | Precondensed alkoxy silane | — | — | — | — | 3.54 | — | — | — |
| | Trienoxy methyl Silane | — | — | 1 | — | — | — | — | — |

TABLE 3b-continued

| COMPONENT | | SAMPLE NO./WT. % | | | | | | | |
|---|---|---|---|---|---|---|---|---|---|
| Type | Identity | 3 | 4 | 5 | 6 | 7 | 8 | 9 | 10 |
| Cat. | Tin | — | — | .01 | — | — | .05 | — | — |
| | Platinum | — | — | — | — | — | — | — | .05 |
| | Inhibitor | | | | | | | | .3 |
| | Camphorquinone | — | — | — | — | — | — | .54 | — |
| | DM-p-T | | | | | | | .54 | |
| Plast. | Siloxane | — | — | — | — | — | — | — | 41.67 |
| Sol. | C$_8$ and C$_{12}$ aromatic/ aliphatic hydrocarbons | Bal. | Bal. | Bal. | Bal. | Bal. | Bal. | Bal. | Bal. |
| Prop. | Propane | — | — | — | — | 40 | — | — | — |

TABLE 3c

| COMPONENT | | SAMPLE NO./WT. % | | | | | |
|---|---|---|---|---|---|---|---|
| Type | Identity | 11 | 12 | 13 | 14 | 15 | 16 |
| Silazane | Triscyclo trisilazane | 5.5 | — | — | — | — | — |
| | Silazane/alkoxy co-functional oligomer | — | — | 2.8 | — | 4.0 | 3.1 |
| Siloxane | PDMS | .5 | .84 | .7 | .05 | 1.0 | .75 |
| | Tetra vinyl cyclosiloxane (ViD4) | — | — | — | — | — | — |
| | Mercapto functional siloxane | — | — | — | — | — | — |
| | Vinyl functional siloxane | — | — | — | — | — | — |
| Silane | Tris (methylamino) methyl silane | — | .21 | — | — | — | — |
| | Tris (hexylamino) methyl silane | — | — | — | — | — | — |
| | Hydride functional silane | — | — | — | — | — | — |
| | Precondensed alkoxy silane | — | — | — | 5.0 | — | — |
| | Trienoxy methyl silane | — | — | — | — | — | — |
| Cat. | Tin | — | — | — | — | — | — |
| | Platinum | — | — | — | — | — | — |
| | Inhibitor | | | | | | |
| | Camphorquinone DM-p-T | — | — | — | — | — | — |
| Plast. | Siloxane | — | — | — | — | — | — |
| Sol. | C$_8$ and C$_{12}$ aromatic/ aliphatic hydrocarbons | Bal. | Bal. | Bal. | Bal. | Bal. | Bal. |
| Prop. | Propane | — | — | 40 | — | 30 | 30 |

The formulations were prepared by combining with mixing the various components in each sample.

Example 4

In Example 4, test method ASTM D 6578-00, was used to evaluate performance of the compositions. In this method, cleanability of graffiti placed on cured coatings of the inventive compositions was evaluated. Here, graffiti resistance was measured based on how a defined set of markings was removed by a defined set of cleaning agents.

As a comparison, the competitive product, TK 1495, available commercially from Sierra, was used. TK 1495 is reported by the manufacturer to contain among other things a homopolymer of hydroxyl diisocyanate and hexamethylene diisocyanate in solvent.

A general description of the methods follow. The following materials were used for testing: aluminum panels, cellulose sponge, cotton cloth, solvent-based ink markers (such as Sharpie or Marks-A-Lots brand), solvent-based spray paint (such as Krylon brand), mild detergent, citrus-based cleaner, isopropyl alcohol ("IPA") and methyl ethyl ketone ("MEK"). One coat of each sample was applied to aluminum Q-panels, and allowed to cure for 10-20 minutes at room temperature (approximately 72° F.), the precise time depending on humidity conditions. The graffiti marking materials were applied to the coated panels and allowed to dry for more than 12 hours at room temperature.

One panel was used for each level of cleanability testing. Each panel was rubbed with a cotton cloth wrapped cellulose sponge wetted with the defined cleaning agent for 25 back and forth cycles. Evaluation of graffiti removal was done by visual inspection. If the graffiti material was completely removed after 25 cycles, testing was determined to be complete and the coating was rated based on the cleaning agent used.

The cleanability level ratings are as follows: 1=marking completely removed using a clean dry cotton cloth. 2=cleaned with a 1% aqueous solution of mild detergent. 3=cleaned with citrus cleaner (D-limonene from Florida Chemical Co). 4=cleaned with IPA. 5=cleaned with MEK. Not cleanable=MEK did not completely remove the graffiti material from the coated panel. The cleanability data of each of Samples 3-8 was observed to be 3.

This method thus did not distinguish the anti-graffiti properties between the samples above and TK 1495 though significant anti-graffiti performance differences were observed as noted in the preceding paragraph.

In addition, the samples did not allow the graffiti marking materials to uniformly wet out a Q-panel when first applied; the ASTM designates this as "repellent". In contrast, TK 1495 caused the graffiti materials to wet out over the panel when first applied; therefore, it is not considered to act as a graffiti repellent. Thus, the methods described above in Example 1 were used.

Example 5

In this example, a composition (Sample No. 7) was packaged in aerosol cans, using propane as a propellant.

The composition was applied in aerosol form to substrates constructed from brick, glass, plastic and various metals for surface appearance observation. Acceptable surface finish on most of these materials was observed. More specifically, the aerosol appearance is listed below in Table 5 as compared with the bulk spray and wiping methods of application.

TABLE 5

| Substrate | Aerosol | Bulk spray | Wipe |
|---|---|---|---|
| Brick | not visible | not visible | not visible |
| Glass | Spotted | barely visible haze | very light streaks |
| Plexi-glass | Spotted | light haze | light streaks |
| Plastic | very light spots | not visible | very light streaks |
| Imron paint | light spots on haze | very light haze | light streaks |
| Aluminum Q-panel | not visible | not visible | not visible |
| Chromed tray | not visible | very light haze | not visible |
| Polished chrome | Spotted | barely visible haze | light streaks |
| Brushed steel panel | not visible | not visible | barely visible streaks |
| Ground steel coupon | light spots on haze | very light haze | not visible |
| Raw steel coupon | not visible | not visible | not visible |

Ten coats of Sample No. 7 were aerosol spray applied to aluminum Q-panels, allowed to dry 10 minutes after each coat and given a 10-minute final cure. Coating thickness was measured as an average of 32 readings and divided by the number of coatings that had been applied to the Q-panels. Thickness readings were taken using an Elcometer 355 digital coating thickness meter, and are recorded in Table 6.

TABLE 6

| Panel Location | Coating Thickness* (micron) |
|---|---|
| Q1 upper | 0.8 |
| Q1 mild | 0.6 |
| Q1 lower | 0.3 |
| Q1 corner | 0.5 |
| Q2 upper | 0.6 |
| Q2 mild | 0.7 |
| Q2 lower | 0.8 |
| Q2 corner | 0.6 |

*The average thickness for each entry an average was taken as an average of 4 readings collected from 4 locations of the coated panel, namely the upper part, middle part, lower part, and every corner of the panel, and the overall thickness was calculated to be 0.061, based on the ten coats which were applied Example 6

In this example, Sample Nos. 3, 6-10 and 11-16 were evaluated as mold release compositions. Apart from Sample No. 12, these samples each demonstrated a gloss value retention on molded parts of at least 80.

More specifically, for instance Sample No. 6 demonstrated a gloss value retention of 86.3 on the molded part. And, Sample No. 3 demonstrated a gloss value retention of 85.0 on the molded part; Sample Nos. 8 and 14 demonstrated a gloss value retention of 91.1 and 87.0, respectively, on the molded part; Sample Nos. 7, 13, 15 and 16 demonstrated a gloss value retention of 85.9, 90.7, 83.2 and 83.0, respectively, on the molded part. The releasability measurements on the molded part were conducted by pouring each sample as a freestanding puddle of about three inches in diameter and allowed to cure over a twelve hour period prior to testing for release properties. Releasability was measured by way of a qualitative scale (1-6) in which 1=did not release, 2=part broke when forcibly released, 3=flexing of board or heavy pressure required for release, 4=moderate pressure required for release, 5=little pressure required for release, and 6=part fell off board (as a pre-release). Sample Nos. 3 demonstrated a release value of 3; Sample Nos. 8 and 14 demonstrated a release value of 5 and 4, respectively; Sample Nos. 7, 13, 15 and 16 each demonstrated a release value of 5.

That which is claimed is:

1. A method of imparting properties selected from the group consisting of mark resistance, particulate repellence, and combinations thereof, to a surface, comprising the steps of:

applying a film coating of a composition to a surface to inhibit markings or particulate build up, respectively, thereon; and exposing the film coating to conditions appropriate to initiate cure of the composition, wherein the composition is prepared from a mixture comprising a functionalized siloxane having the formula:

wherein $R_1$, $R_2$, $R_3$, $R_4$, $R_5$ and $R_6$ are each independently selected from siloxane, alkyl, allyl, aryl, alkoxy, amino, hydroxyl, hydrogen, mercapto, halo, and cyano, and n is from 0 to about 100,000 and $P_1$ and $P_2$ are each independently selected from hydroxyl, hydrogen, acetoxy, alkoxy, enoxy, and oxime;

a silazane comprising the formula:

wherein each R is independently methyl or ethyl, y ranges from about 20% to about 80% of the structure, z ranges from about 1% to about 40% of the structure, and n is from 1 to about 500;

and further comprising at least one crosslinking agent selected from the group consisting of an amino functional silane, an enoxy functional silane, a silazane, and combinations thereof, and optionally, a carrier.

2. The method of claim 1, wherein moisture initiates cure of the composition at ambient temperature.

3. The method according to claim 1, wherein said functionalized siloxane is a hydroxy terminated poly siloxane.

4. The method according to claim 1, wherein one said crosslinking agent is tris cyclo silazane represented by the structural formula:

5. The method according to claim 1, wherein said functionalized siloxane is hydroxy terminated and one said crosslinking agent is an amino functional silane.

6. A method of enhancing the gloss value of a part molded in a mold coated with a cured mold release composition to at least 80, comprising the steps of:
applying a film coating of a mold release composition to a surface in a mold;
exposing the film coating to conditions appropriate to initiate cure of the composition, wherein the composition is prepared from a mixture comprising
a functionalized siloxane having the structure:

wherein $R_1$, $R_2$, $R_3$, $R_4$, $R_5$ and $R_6$ are each independently selected from siloxane, alkyl, allyl, aryl, alkoxy, amino, hydroxyl, hydrogen, mercapto, halo, and cyano, and n is from 0 to about 100,000 and $P_1$ and $P_2$ are each independently selected from hydroxyl, hydrogen, acetoxy, alkoxy, enoxy, and oxime;
a silazane comprising the formula:

wherein each R is independently methyl or ethyl, y ranges from about 20% to about 80% of the structure, z ranges from about 1% to about 40% of the structure, and n is from 1 to about 500; and
at least one crosslinking agent selected from the group consisting of an amino functional silane, an enoxy functional silane, a silazane, and combinations thereof, and optionally, a carrier; and
molding the part in the coated and cured mold wherein a surface of the part has a gloss value of at least 80.

7. The method of claim 6, wherein moisture initiates cure of the composition at ambient temperature.

8. The method of claim 6 wherein the composition cures at ambient temperature in less than 30 minutes upon exposure to moisture.

9. A method of coating a surface to ease removal of unwanted markings from that surface, comprising:
identifying the surface on which subsequently applied markings are not wanted;
applying a thin layer of an uncured composition to the surface, the composition prepared from a mixture comprising
a functionalized siloxane having the structure wherein $R_1$, $R_2$, $R_3$, $R_4$, $R_5$ and $R_6$ are each independently selected from siloxane, alkyl, allyl, aryl, alkoxy, amino, hydroxyl, hydrogen, mercapto, halo, and cyano, and n is from 0 to about 100,000 and $P_1$ and $P_2$ are each independently selected from hydroxyl, hydrogen, acetoxy, alkoxy, enoxy, and oxime;
a silazane comprising the formula:

wherein each R is independently methyl or ethyl, y ranges from about 20% to about 80% of the structure, z ranges from about 1% to about 40% of the structure, and n is from 1 to about 500;
at least one crosslinking agent selected from an amino functional silane, an enoxy functional silane, a silazane, and combinations thereof and optionally, a carrier; and
exposing the thin layer of uncured composition to conditions appropriate to cure the composition, wherein reaction products of the composition form a thin cured coating on the surface that is substantially transparent and unwanted markings made on the thin cured coating are readily removable.

10. The method according to claim 9, wherein said functionalized siloxane is a hydroxy terminated polydimethylsiloxane and one said crosslinking agent is tris cyclo silazane.

11. The method according to claim 9, wherein said functionalized siloxane is a hydroxy terminated polydimethylsiloxane.

12. The method according to claim 9, wherein said functionalized siloxane is a hydroxy terminated polydimethylsiloxane and one said crosslinking agent is amino functional silane.

13. The method according to claim 9, wherein the thin coating of cured composition has a gloss value of at least 80 as measured by a 60 degree gloss meter.

14. The method according to claim 9, wherein the thin coating of cured composition has a tape test anti-graffiti rating of 5.

15. The method according to claim 9, wherein the thin cured coating is graffiti repellent under ASTM 6578-00.

16. The method of claim 9, wherein the composition further comprises a moisture cure catalyst and exposure to moisture will initiate cure of the composition which is cured after exposure to moisture at ambient temperature for less than 30 minutes.

17. The method of claim 9, wherein the functionalized siloxane has the formula:

wherein $R^1$, $R^2$, $R^3$, $R^4$, $R^5$, and $R^6$ are each independently selected from $C_{1-6}$ alkyl and n is from 1 to about 30,000; and the mixture further comprises a silazane comprising the formula:

wherein each R is independently methyl or ethyl, x ranges from about 20% to about 50% of the structure, y ranges from about 20% to about 80% of the structure, and z ranges from about 0% to about 40% of the structure, and one said crosslinking agent is an amino functional silane.

* * * * *